United States Patent Office 3,129,156
Patented Apr. 14, 1964

3,129,156
PREPARATION OF VINYL FLUORIDES
Peter J. Manno and William H. Snavely, Jr., Ponca City, Okla., assignors to Continental Oil Company, Ponca City, Okla., a corporation of Delaware
No Drawing. Filed Mar. 31, 1960, Ser. No. 18,812
1 Claim. (Cl. 204—163)

This invention relates to a method for the preparation of fluorohydrocarbons and especially of vinyl fluorides. More particularly, this invention relates to a catalytic process for the preparation of such compounds which process utilizes a procedure involving nuclear radiation.

Various catalytic processes have been proposed for the production of vinyl fluorides. In one process, vinyl fluoride has been produced by the interaction of hydrogen fluoride with acetylene in the presence of mercuric fluoride as a catalyst. Mercuric fluoride is very unstable, particularly at elevated temperatures, and this property makes the use of this salt as catalyst for large scale production of vinyl fluoride impractical.

It is also known that vinyl fluoride may be obtained by reacting acetylene and hydrogen fluoride in the presence of a mercuric chloride catalyst, but this method of operation results in low yields and the catalyst quickly becomes depleted, thus rendering this procedure commercially unattractive. Other catalytic processes involving many different catalysts consisting of compounds of many different metals and metal oxides either alone or supported on a suitable substrate have also been proposed for the production of these compounds. Particularly useful compositions are those obtained by impregnating charcoal with a suspension of mercury oxide or by formation of the oxide in situ on the charcoal. In one process, highly useful charcoal-supported mercury compound catalysts are disclosed as employable in the synthesis of vinyl fluoride and fluoroprenes. In another process, there are also described compositions comprising mercury oxide at least partially combined chemically with an oxide of nitrogen supported on an alkaline earth metal salt. Although these catalysts are advantageously useful for their designed purposes, at times they are characterized by certain disadvantages. Thus, a large part of the total mercury present in the charcoal-supported catalysts may be lost as a free mercury either during the catalyst preparation or during its operation, thus reducing its activity. These charcoal-supported mercury catalysts, although initially very active in the fluoroprene and vinyl fluoride synthesis, tend to become less active during use. For instance, in 12 to 16 hours, they may frequently lose as much as 50 percent of their original activity.

It is, therefore, a primary object of the present invention to provide a catalytic process for the preparation of vinyl fluorides which process obviates the disadvantages of the prior art processes.

It is another object of our invention to provide a practical process for the production of a vinyl fluoride from an alkyne and hydrogen fluoride.

It is another object of this invention to provide a process for the production of a vinyl fluoride from 1,1-difluoroalkane and hydrogen fluoride.

It is another object of the present invention to provide a method for increasing the yield of a vinyl fluoride obtained by the reaction of hydrogen fluoride with an alkyne or 1,1-difluoroalkane.

It is another object of our invention to provide a method of increasing the life of the catalyst used in the process.

These and other objects and advantages of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a process for the production of vinyl fluorides which consists in passing a mixture in the vapor phase comprising hydrogen fluoride and an alkyne or 1,1-difluoroalkane over a catalyst at an elevated temperature. The invention is further characterized in that the catalyst is subjected to nuclear radiation which may be preirradiation or in situ irradiation while contacting the reactants. Following the reaction, the reaction mixture is cooled and the vinyl fluoride recovered therefrom.

Before proceeding with specific examples illustrating our invention, it may be well to indicate in general the nature of the materials required in the process.

Suitable alkynes or as they are sometimes called acetylenes include those containing up to 10 carbon atoms per molecule, for example, propyne, butyne, pentyne, hexyne, heptyne, octyne, etc. Of the alkynes, we generally prefer acetylene. As to the 1,1-difluoroalkanes, any are suitable containing up to 10 carbon atoms per molecule. But here again we generally prefer to use the lowest number of the series, namely, 1,1-difluoroethane. Other 1,1-difluoroalkanes which can be used are 1,1-difluoropropane, 1,1-difluorobutane, 1,1-difluoropentane, 1,1-difluorohexane, 1,1-difluoroheptane, and the like.

The hydrogen fluoride used should preferably be anhydrous.

Suitable catalysts include any of the metals and metal oxides disclosed in the prior art used alone or supported on a suitable substrate. In addition to the catalysts disclosed in the prior art, we have found that the transition metals of which titanium and zirconium are examples or their oxides are also suitable for use in our process. Although any of the foregoing catalysts may be used as such, we prefer to employ them in conjunction with a catalyst support such as charcoal. When alumina is used as the catalyst, it is neither important nor necessary to use a catalyst support.

Since the reaction is carried out preferably in the vapor phase, a temperature range should be selected at which the reactants exist as a vapor. For that reason, we generally prefer to operate within a temperature range varying from about 20° C. to 100° C. In view of the fact that the particular reactants, the alkyne or the 1,1-difluoroalkane, may be selected from a rather large list, it will not be possible to define the temperature range in more specific terms than the above. It is to be understood, however, that higher or lower temperatures may be used with a resultant increase or decrease in the reaction rate in accordance with the general law of chemical reactions.

An important factor in reactions of this type as is well known to those skilled in the art is the "space velocity." By this term is meant the rate at which the reactants as a gas or vapor pass through the catalyst and is defined as the number of volumes of gas or vapor calculated at standard conditions of pressure and temperature, which traverses one volume of catalyst during one hour. Suitable space velocities for use in our process vary from 10 to 500.

As to the relative volumes of the alkyne or 1,1-difluoroalkane to that of the hydrogen fluoride, that may vary from 0.1 to 20 volumes per volume of hydrogen fluoride. Preferably, this ratio should vary from 1 to 2 volumes of the alkyne or 1,1-difluoroalkane per volume of hydrogen fluoride.

The catalyst may be subjected to irradiation either before the reactants are passed over it, referred to as preirradiation, or while the reactants are being passed over it. When the latter procedure is used, it is referred to as in situ irradiation. Furthermore, we have found it possible to reactivate the catalyst by means of irradiation. As would be expected, we have found that reactivation may be accomplished by either preirradiation or by in situ irradiation. Gamma radiation is used for carrying out this phase of the invention. The radiation intensity can vary over a wide range, usually from about $1 \times 10^4$ to about $1 \times 10^7$ reps, more specifically from about $5 \times 10^4$ to about $1 \times 10^6$ reps.

In order to disclose the nature of the present invention still more clearly, the following illustrative examples will be given. It is to be understood that the invention is not to be limited to the specific conditions or details set forth in these examples except insofar as such limitations are specified in the appended claim.

*Example 1*

Acetylene and anhydrous hydrogen fluoride in equal volumes were passed over a charcoal supported mercuric oxide catalyst at a temperature of 23° C. and at a rate of .10 volume of acetylene per volume of catalyst per hour. Prior to use, the catalyst had been irradiated for $1 \times 10^7$ reps in a gamma field. The yield of vinyl fluoride was equal to 70 percent of theory based on the amount of acetylene consumed.

*Example 2*

The procedure of Example 1 was repeated with two exceptions: 1,1-difluoroethane and alumina were substituted for the acetylene and charcoal supported mercuric oxide catalyst, respectively. By recycling the 1,1-difluoroethane, it is possible to achieve 100 percent conversion to vinyl fluoride.

While particular embodiments of the invention have been described, it will be understood, of course, that the invention is not limited thereto since many modifications may be made, and it is therefore contemplated to cover by the appended claim any such modifications as fall within the true spirit and scope of the invention.

The invention having thus been described, what is claimed and desired to be secured by Letters Patent is:

In a process for manufacture of vinyl fluoride by vapor phase reaction of 0.1 to 20 volumes of acetylene with 1 volume of anhydrous hydrogen fluoride at a temperature varying from 20 to 100° C. in the presence of a mercuric oxide catalyst, at an hourly space velocity of 10 to 500 volumes of reactants per volume of catalyst, followed by recovery of vinyl fluoride as a reaction product, the step of subjecting said catalyst to gamma radiation.

References Cited in the file of this patent

UNITED STATES PATENTS

| | | |
|---|---|---|
| 2,307,552 | Vaughn et al. | Jan. 5, 1943 |
| 2,743,223 | McClinton et al. | Apr. 24, 1956 |
| 2,845,414 | Schutze | July 29, 1958 |
| 2,892,000 | Skiles | June 23, 1959 |
| 2,905,608 | Noddings et al. | Sept. 22, 1959 |
| 3,012,953 | Greenwald et al. | Dec. 12, 1961 |

FOREIGN PATENTS

| | | |
|---|---|---|
| 665,263 | Great Britain | Jan. 23, 1952 |

OTHER REFERENCES

Journal of American Chemical Society, vol. 76, 1954, pages 971–973.

Nature, vol. 180 (July 20, 1957), page 140.